S. B. LIVINGSTON.
CLUTCH LOCK.
APPLICATION FILED MAR. 13, 1920.
1,414,884.
Patented May 2, 1922.
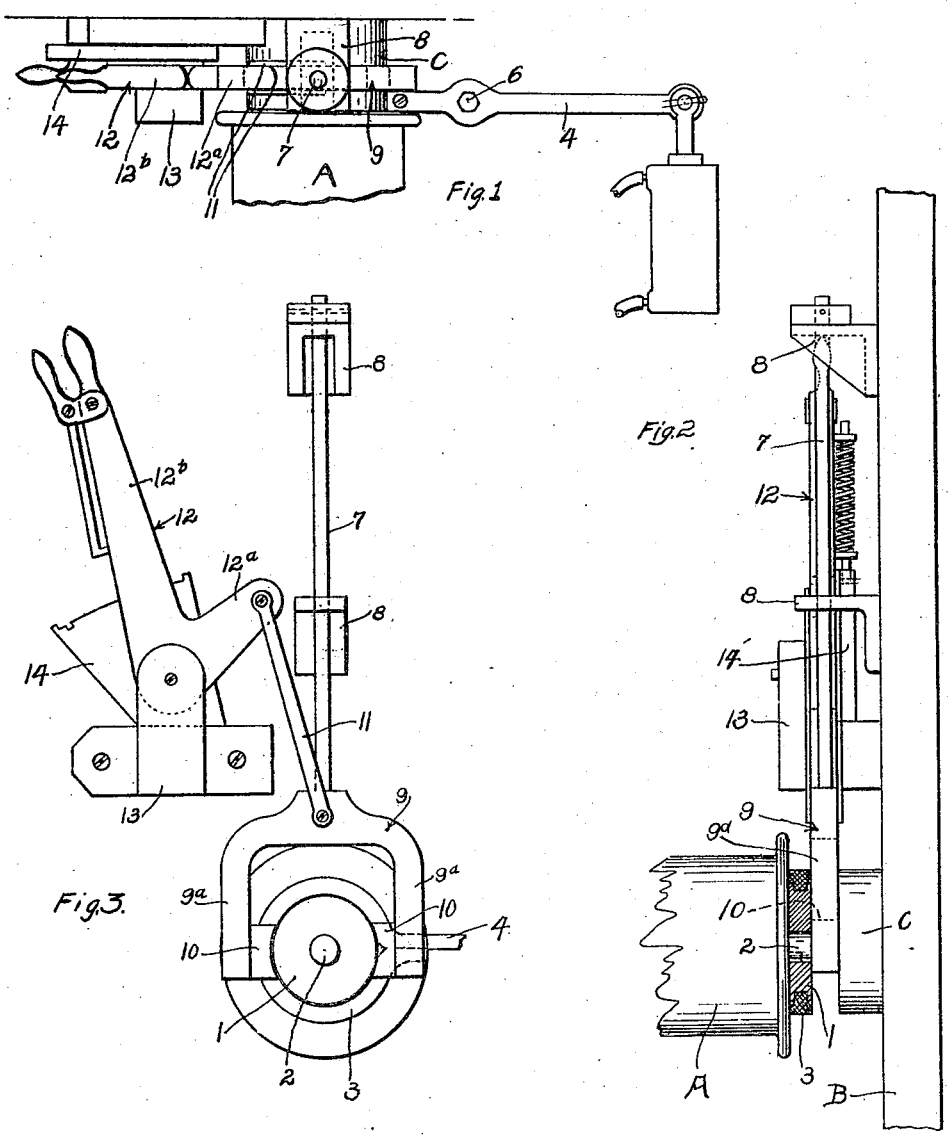
Inventor
S. B. Livingston.
By Victor J. Evans
Attorney

UNITED STATES PATENT OFFICE.

SAMUEL B. LIVINGSTON, OF WILSON, PENNSYLVANIA.

CLUTCH LOCK.

1,414,884. Specification of Letters Patent. Patented May 2, 1922.

Application filed March 13, 1920. Serial No. 365,506.

*To all whom it may concern:*

Be it known that I, SAMUEL B. LIVINGSTON, a citizen of the United States, residing at Wilson, in the county of Allegheny and State of Pennsylvania, have invented new and useful Improvements in Clutch Locks, of which the following is a specification.

This invention relates to clutch locking means, and more particularly to a clutch lock specially adapted for use in connection with the drum and clutch of a locomotive crane.

One of the main objects of the invention is to provide simple and efficient means for locking the clutch against movement away from the drum during the lifting operation. A further object is to provide simple and efficient means for positively holding the locking device in adjustment. Another object is to provide a lock which will not interfere with free rotation of the clutch. Further objects will appear from the detailed description.

In the drawings:—

Figure 1 is a top plan view of a lock constructed in accordance with my invention, as applied.

Figure 2 is a front view.

Figure 3 is a side view.

This lock is used in connection with a winding drum A of usual type rotatably mounted in frame B of the crane in the well known manner. A clutch member 1 is feathered on shaft 2 of the drum and cooperates with the end portion of the drum for connecting the same to the shaft so as to rotate therewith, in the known manner.

A yoke or ring 3 surrounds clutch member 1 and is loosely connected thereto in the usual manner, this ring being provided with an operating lever or bar 4 pivoted intermediate its ends, at 6. This lever may be operated by pneumatic means, as illustrated, or manually, as desired for throwing the clutch 1 into and out of operation.

A vertically disposed guide rod 7 is slidably mounted through brackets 8 secured to frame B, this rod being positioned in the vertical plane of the axis of the drum. A yoke 9 is secured upon the lower end of this rod and, when lowered, straddles the shaft of the drum. Brass blocks 10 are secured upon the inner faces of arms $9^a$ of the yoke, and are so positioned as to engage between ring 3 and bearing block C when the yoke is lowered and the clutch is in. These blocks serve to positively lock the clutch against outward movement thus eliminating all danger of disengagement of the clutch, and as the blocks press against the clutch ring only all interference with free rotation of the clutch member 1 is eliminated.

A link 11 connects the center of the bight of the yoke to one arm $12^a$ of an angle lever 12 pivoted upon a bracket 13 secured to frame B. A quadrant plate 14 is secured to the opposite side of the bracket from lever 12 and is provided with spaced notches coacting with the usual spring pressed detent carried by arm $12^b$ of lever 12 for locking the lever in adjustment, arm $12^b$ being also provided with the usual means for raising the detent when the arm is grasped, in the known manner.

What I claim is:

In combination with a shaft, a drum mounted thereon, a bearing member for the shaft, and a clutch member slidable on the shaft into and out of engagement with the drum; a ring connected to said clutch member for shifting the same, a yoke adjustable toward and away from the shaft, and blocks mounted on the arms of the yoke and adapted to fit snugly between said ring and the bearing member when the clutch member is in and the yoke is moved into operative position toward said shaft.

In testimony whereof I affix my signature.

SAMUEL B. LIVINGSTON.